United States Patent [19]
Swirkal

[11] Patent Number: 5,246,190
[45] Date of Patent: Sep. 21, 1993

[54] TRASH BAG CLIP FOR CARS

[76] Inventor: Hugo L. Swirkal, 19609 Sherman Way, #218, Reseda, Calif. 91335

[21] Appl. No.: 967,232

[22] Filed: Oct. 27, 1992

[51] Int. Cl.$^5$ .............................................. B65B 67/00
[52] U.S. Cl. ...................................... 248/100; 211/90
[58] Field of Search ......................... 248/100, 99, 544; 211/88, 90; 224/42.46

[56] References Cited

U.S. PATENT DOCUMENTS

| | | | |
|---|---|---|---|
| 2,778,553 | 1/1957 | Satrom et al. | 248/99 X |
| 2,778,554 | 1/1957 | Porkola | 248/99 X |
| 2,884,174 | 5/1959 | Davitt | 224/42.46 |
| 3,342,343 | 9/1967 | Youlden | 211/88 |
| 3,895,605 | 7/1975 | Goldman | 211/88 X |
| 4,695,020 | 9/1987 | Collins | 248/100 |
| 4,723,740 | 2/1988 | Courtemanche et al. | 248/95 |
| 4,735,340 | 4/1988 | Preston | 220/404 |

Primary Examiner—Alvin C. Chin-Shue
Assistant Examiner—Sarah A. Lechok
Attorney, Agent, or Firm—Christie, Parker & Hale

[57] ABSTRACT

A mounting clip for trash bags used in automobiles comprises an elongated channel having a continuous rear wall and two upwardly projecting hooks spaced apart by a distance sufficient so that the flexible hook-type handles on a disposable plastic carrying bag commonly available in stores can be held by the corresponding hooks of the clip. A pair of elongated bendable mounting strips are spaced apart and permanently secured to the rear wall of the channel. Each strip is bendable into any desired configuration and capable of being reconfigured if desired. The strips are preferably made from metal to provide self-supporting properties and the ability to be bent and reconfigured. The clip is removably connected to any part of an automobile dashboard, such as the upper edge of a glove compartment door or an ashtray, followed by closing the door or ashtray over the strips to hold the clip in its fixed position for connection to the flexible handles of the disposable plastic carrying bag.

14 Claims, 3 Drawing Sheets

TRASH BAG CLIP FOR CARS

FIELD OF THE INVENTION

This invention relates to a clip that releasably mounts to a dashboard of an automobile for holding a disposable bag for receiving trash.

BACKGROUND OF THE INVENTION

There is a constant need to maintain clean highways by discouraging passengers of automobiles from throwing trash out the window of the vehicle. Over the years various trash bag holders have been developed for attaching to the dashboard of an automobile to hold a bag for receiving trash. Various designs of bags for containing trash disposed of inside the vehicle also have been developed, especially as novelty items.

The present invention is based on a recognition that a trash bag holder for automobiles should attach to the dashboard without requiring any permanent means of fastening to the dashboard. This approach has several advantages, including simplifying mounting of the trash bag holder to the car's dashboard, avoiding modifications that may permanently mar the dashboard, and reducing manufacturing costs. As a result, greater use of trash bags for containing trash disposed of during travel is encouraged.

The trash bag holder of this invention is adapted for use with inexpensive and easily available trash bags, which further reduces cost, increases convenience, and also encourages use. In recent years, stores have been supplying customers with thin, flexible plastic carrying bags having handle-forming cutouts adjacent the open end of the bag. These plastic bags are stronger and lighter than paper bags and they are designed to be disposable after purchased items are carried home and removed. The invention enables them to be conveniently used with the trash bag holder as a means of containing trash disposed of in the vehicle.

SUMMARY OF THE INVENTION

Briefly, one embodiment of the present invention provides a dashboard mounting clip that releasably attaches to a long, narrow slotted opening formed in a dashboard, such as the opening formed at the juncture between a top edge of a glove compartment door and the surrounding dashboard structure. The dashboard mounting clip comprises a body portion having an elongated, flat upright rear wall, and a pair of narrow upright hooks spaced in front of the rear wall and spaced apart from each other along the length of the clip. Each hook is joined integrally to the rear wall and spaced a short distance in front of the rear wall by a retaining channel on the body portion of the clip. A pair of elongated, thin, flat, bendable mounting strips are secured to the rear wall of the clip. The strips are spaced apart along the length of the rear wall, and a free end portion of each strip is extendable away from the rear wall in a direction opposite from the spaced apart hooks. The flat free end portions of the strips lie generally in a common plane, and each strip is malleable sufficiently to be bent into a configuration that conforms to the shape of the glove compartment door, or other object to which the clip may be mounted on the dashboard. The strips are of low profile to fit into the narrow slotted opening on the dashboard above the glove compartment door without interference to closing or opening of the door. The bendable strips retain the shape to which they have been configured to remain adherently but releasably secured to the door in a molded fit that allows movement of the door while the clip remains secured to it.

In a preferred form of the invention, the bendable strips comprise flat, pliable pieces of metal that are self-supporting while providing the capability of selectively bending into the desired configuration of the object to which the clip is mounted. The clip is mounted so the spaced apart hooks face outwardly to provide a means for releasably holding the flexible handles of a plastic bag. The hooks have a length and a mutual spacing sufficient to hold the handles of the bag in a secure position with the bag hanging downwardly and in an open position to facilitate easily placing trash in the bag.

Thus, the trash bag clip can be releasably secured to various convenient locations on the dashboard without being limited by the geometric configuration of the object to which it is mounted. The clip also can be easily removed or repositioned. In any case, there are no separate fasteners or permanent means of attachment required to mount the clip to the dashboard. This in combination with its use with the disposable plastic bags easily available in stores provides an inexpensive and convenient means for collecting trash in the vehicle.

These and other aspects of the invention will be more fully understood by referring the following detailed description and the accompanying drawings.

DETAILED DESCRIPTION

Figure 1:
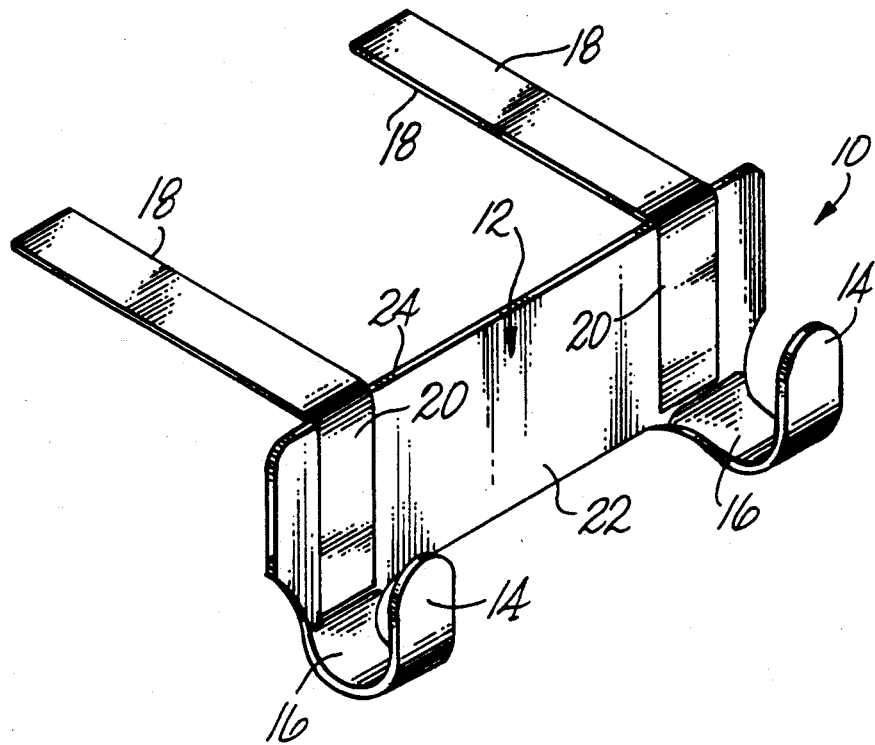
FIG. 1 is a perspective view illustrating a trash bag mounting clip according to principles of this invention.
Figure 2:
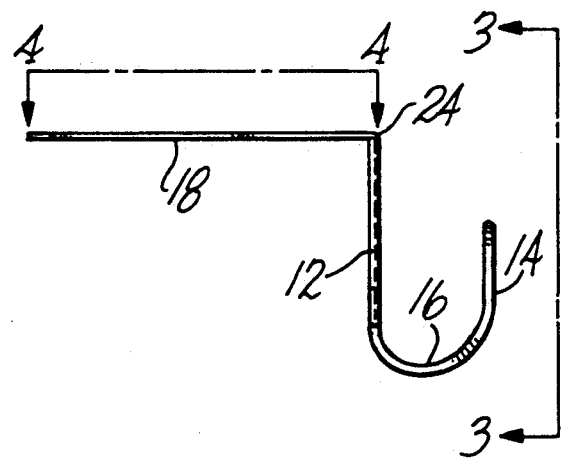
FIG. 2 is a side elevation view of the trash bag mounting clip.
Figure 3:
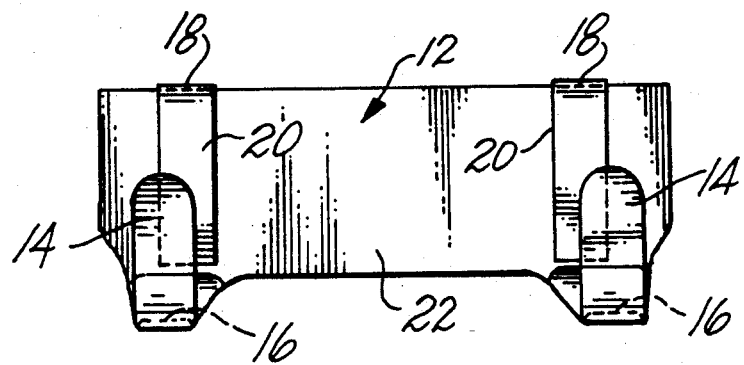
FIG. 3 is a front elevation view taken on line 3—3 of FIG. 2.

FIGS. 1 through 3 illustrate the detailed construction of a trash bag mounting clip 10 according to principles of this invention. As described below, the clip is mounted to the front of an automobile dashboard and is used to hold a bag for containing trash. The clip includes an elongated channel made of plastic and having a continuous flat upright rear wall 12 and two upwardly projecting hooks 14 spaced apart along the length of the rear wall 12 and uniformly spaced in front of the rear wall 12. The hooks are in a common plane and extend parallel to each other. The hooks 14 and the rear wall 12 are integrally formed as a one piece unit with base portions 16 of a channel-forming portion of the clip projecting away from the bottom of the rear wall 12 to hold the base of the hooks so the hooks project upwardly in fixed positions at opposite ends of the clip. Alternatively, the base portions 16 of the channel could be one continuous piece extending from one hook to the other, but the configuration shown in FIG. 1 is desired because it saves material in the plastic molding process.

A pair of mutually spaced apart and parallel, elongated, flat, bendable mounting strips 18 project away from the rear wall of the clip. Upright front portions 20 of the mounting strips are permanently secured to the upright rear wall of the clip. There are several suitable means for permanently securing the front portions 20 of the strips to the clip. In one embodiment, the inside face 22 of the rear wall 12 is recessed to a very shallow depth matching the configuration of the flat front portions 20 of the strips. The strips are adhesively secured by a permanent adhesive to these recessed portions of the clip so that the front faces of the strip portions 20 are continuous with a front face 22 of the rear wall 12. Alternately, the recessed areas can be omitted and the front portions 20 of the strips simply bonded to the inside wall 22 of the clip by a suitable permanent adhesive.

Figure 4:
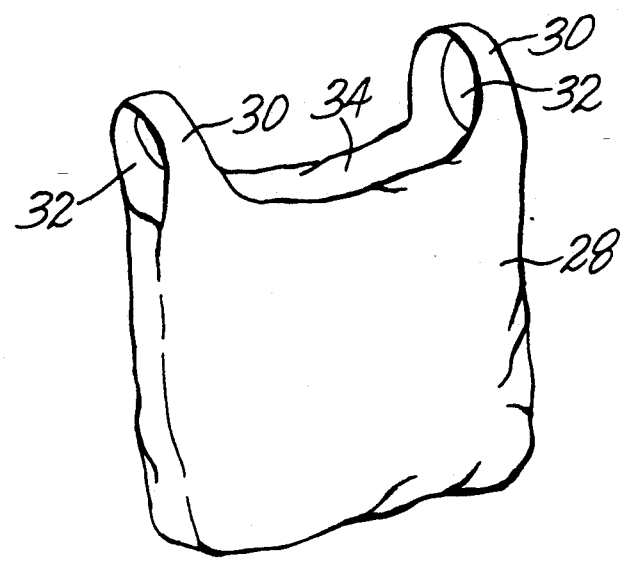
FIG. 4 is perspective view illustrating a type of trash bag that can be used with the trash bag mounting clip.

As shown best in FIGS. 1 and 2, a majority of the length of the mounting strips 18 projects away from a top edge 24 of the upright rear wall 12 in a direction away from the hooks 14. However, the mounting strips are bendable into any desired configuration or extendable in any direction. The configuration shown in FIGS. 1 and 2 is simply illustrated as a convenient means of positioning the strips prior to their use in attaching the clip to an object on the front of an automobile dashboard. Referring to FIG. 4, each mounting clip comprises a thin, generally flat, pliable supporting piece made of metal. The strips are configured so they are substantially wider than in thickness, preferably at least about an order of magnitude greater in width than thickness. The mounting strips can be made entirely of metal or they can be coated with a protective material such as plastic. Alternatively, they can comprises a flat plastic strip reinforced by an embedded flat metal strip. The plastic material avoids sharp edges and enhances adhesion to the plastic body of the clip. Therefore, the metal component of the strip in any event provides self-supporting properties and the ability to be bent into a desired configuration, to maintain the configuration the strip has been conformed to, and to be reconfigured into any other selected shape.

FIG. 4 illustrates a plastic carrying bag 28 having loop-type handles 30 formed at its open end by circular cutouts 32. The flexible handles 30 project above an elongated opening 34 at the top of the bag. The bag is preferably one of the small-sized disposable thin plastic bags for containing small articles purchased at stores. The bag is normally intended to be thrown away after use, but it can be used with the present invention for attaching to the trash bag mounting clip 10 to provide a convenient means of containing trash disposed of when passengers are traveling in an automobile.

Figure 5:
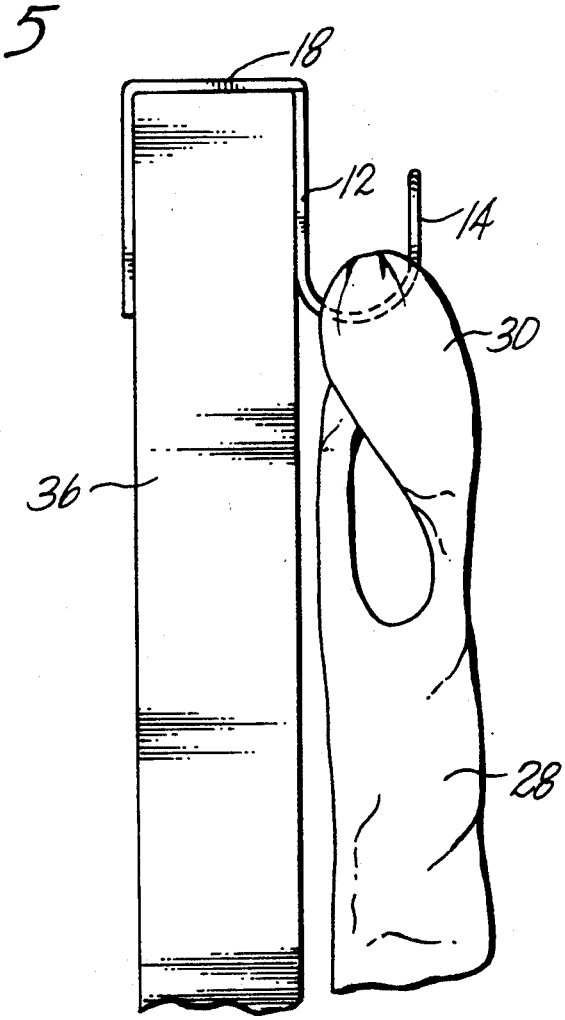
FIG. 5 is an enlarged fragmentary side elevation view showing the trash bag clip in use holding a trash bag with the trash bag mounting strip bent into a configuration that releasably secures it to a glove compartment door of an automobile.

In using the invention, the mounting clip is releasably secured to any object on the front of the dashboard that will allow the free ends of the strips to be bent to conform to the configuration of the object so as to securely hold the clip to an exposed front face of the object. Preferably, the clip is secured to the front of a glove compartment door 36 shown in FIG. 5. As shown in the illustration, both strips can be individually bent to conform to the angular configuration of the top edge of the glove compartment door. The low profile of the flat strips makes it possible to conform closely to the configuration of the door and to allow the door to be closed without interference from the strips. The door also can be rotated open while the clip remains secured to the door. Thus, the strips remain secured to the dashboard, held in place within the narrow slotted opening at the juncture between the top edge of the door and the surrounding dashboard. The glove compartment door being closed may apply a certain level of pressure to assist in retaining the clip in a secure stationary position on the front of the dashboard. The mounting strips being malleable into any desired configuration assist in conforming the mounting strips to the shape of any of a wide variety of glove compartment doors available in automobiles today. In addition, the mounting strips also can be configured to any of numerous shapes and sizes of other openable and closeable objects on a dashboard such as the various configurations of ashtrays available in automobiles today.

Figure 6:
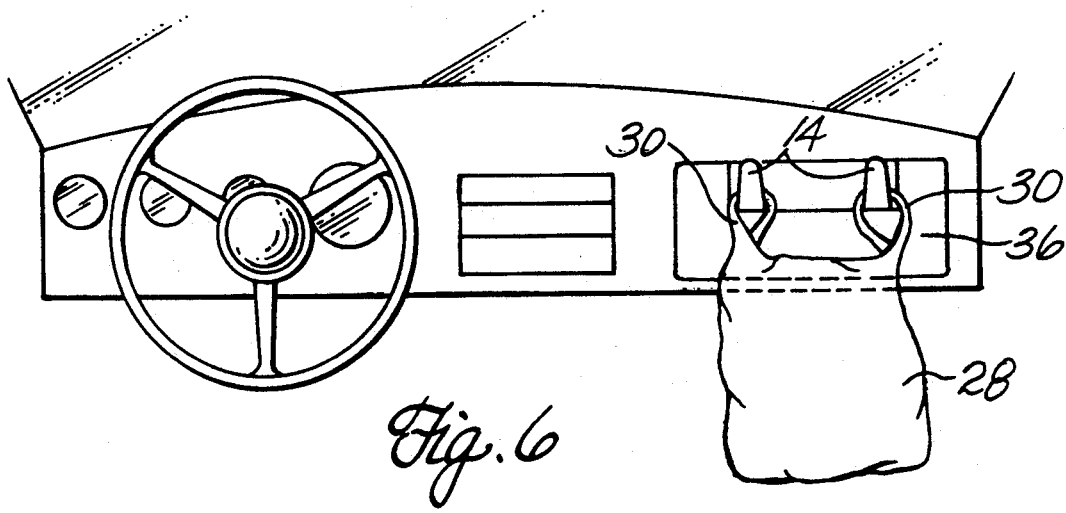
FIG. 6 is a fragmentary, semi-schematic elevation view illustrating the trash bag clip in use holding a trash bag on the dashboard of an automobile.

Once the mounting clip is in place on the front of the dashboard, the flexible handles 30 of the plastic bag 28 are secured to the hooks 14 on the clip. Each handle is releasably secured to a corresponding hook by preferably twisting each handle around the hook with at least one loop and then pulling the bag downwardly so the trash bag hangs down in front of the glove compartment door as shown in FIG. 6. The hooks 14 are spaced apart along the length of the clip by a distance sufficient so that the flexible handles of the bag can be individually held by the corresponding hooks in a way that assists in holding the bag in an open position. For instance, if both handles of the bag were connected to a single hook, the handles of the bag cannot be normally held apart sufficiently to hold the bag in the desired open position to facilitate easily placing trash in the bag.

In a preferred form of the invention, the hooks are spaced apart by an on-center distance of about 2¼ to about 3 inches. Moreover, the width of each hook is preferably about ⅜ to about ½ inch, and the length of each hook from top to bottom is about ⅞ inch to about 1¼ inch. This configuration allows the handles of the bag to be easily retained on the hooks while holding the handles of the bag spaced apart by a distance that retains the bag in its open position. Also in a preferred form of the invention, the mounting strips have a width from about ¼ to about 5/16 inch. The metal strip is about 0.010 to about 0.012 inch in thickness, and has a length of about three inches. In a preferred embodiment, the metal strips are completely covered by a thin layer of plastic.

Thus, the mounting clip provides a means for securing a trash bag holder to various locations on the front of a dashboard without any extraneous means of permanent attachment to the dashboard. Use of the clip is simple, and manufacturing costs are low, not to mention being adaptable for use with normally disposable plastic carrying bags available in stores.

What is claimed is:

1. A dashboard mounting clip that releasably attaches to a long, narrow slotted opening in a dashboard, such as a juncture formed between a top edge of a glove compartment door or the like and an adjacent wall of the surrounding dashboard, the dashboard mounting clip comprising a body portion having an elongated flat, upright rear wall, and a pair of narrow, upright hooks spaced in front of the rear wall and mutually spaced apart from each other along the length of the rear wall, each hook joined integrally to the rear wall and spaced a short distance in front of the rear wall by a retaining channel in said body portion; and a pair of elongated thin, generally flat, bendable mounting strips secured to the rear wall and mutually spaced apart along the length of the rear wall, the strips each being extendable away from the rear wall in a direction opposite from the spaced apart hooks, the flat portions of the strips lying generally in a common plane with each strip being flexible, self-supporting and malleable sufficiently to be bent into a configuration that conforms to the shape of the door while fitting over a top edge of the door and into said narrow slotted opening, the bendable strips retaining the shape to which they have been configured to remain adherently but releasably secured to the door in a molded fit that allows movement of the door while the clip remains releasably secured thereto so the hooks of the clip can releasably retain corresponding flexible handles of a disposable plastic bag.

2. Apparatus according to claim 1 in which the hooks are spaced apart lengthwise along the clip by a distance from about 2¼ to about 3 inches apart.

3. Apparatus according to claim 2 in which the width of each hook is about ⅜ to about ½ inch.

4. Apparatus according to claim 2 in which each hook has a height from about ⅞ to about 1¼ inch.

5. Apparatus according to claim 1 in which the flat mounting strips are made from a metal coated with plastic.

6. Apparatus according to claim 5 in which the mounting strip comprises a flat metal strip having a thickness of about 0.010 to 0.012 inch and a width from about ¼ to about 5/16 inch.

7. Apparatus according to claim in which the mounting strips are made of metal and have a width substantially greater than their thickness.

8. Apparatus according to claim 7 in which the mounting strips have a width of about ¼ to about 5/16 inch.

9. A dashboard mounting clip that releasably attaches to a long, narrow slotted opening in a dashboard, such as a juncture formed between a top edge of a glove compartment door or the like and an adjacent wall of the surrounding dashboard, the dashboard mounting clip comprising a body portion having an elongated flat, upright rear wall, and at least one upright hook spaced in front of the rear wall and joined integrally to the rear wall and spaced a short distance in front of the rear wall by a retaining channel in said body portion; and at least one elongated, thin, generally flat, bendable mounting strip secured to the rear wall and extendable away from the rear wall in a direction opposite from the hook, the strip being flexible, self-supporting and malleable sufficiently to be bent into a configuration that conforms to the shape of the door while fitting over a top edge of the door and into said narrow slotted opening, the bendable strip retaining the shape to which it has been configured to remain adherently but releasably secured to the door in a molded fit that allows movement of the door while the clip remains releasably secured thereto so the hook of the clip can releasably retain the flexible handles of a disposable plastic bag.

10. Apparatus according to claim 9 in which the strip is made of metal coated with plastic.

11. Apparatus according to claim 9 in which the bendable strip includes a thin, flat metal strip.

12. A dashboard mounting clip that releasably attaches to a long, narrow slotted opening in a dashboard, such as a juncture formed between a top edge of a glove compartment door or the like and an adjacent wall of the surrounding dashboard, the dashboard mounting clip comprising a body portion having an elongated flat, upright rear wall, and at least one narrow, upright hook spaced in front of the rear wall and joined integrally to the rear wall and spaced a short distance in front of the rear wall by a retaining channel in said body portion; and a pair of elongated thin, generally flat, bendable mounting strips secured to the rear wall and mutually spaced apart along the length of the rear wall, the strips each being extendable away from the rear wall in a direction opposite from the hook, the flat portions of the strips lying generally in a common plane with each strip being flexible, self-supporting and malleable sufficiently to be bent into a configuration that conforms to the shape of the door while fitting over a top edge of the door and into said narrow slotted opening, the bendable strips retaining the shape to which they have been configured to remain adherently but releasably secured to the door in a molded fit that allows movement of the door while the clip remains releasably secured thereto so the hook of the clip can releasably retain corresponding flexible handles of a disposable plastic bag.

13. Apparatus according to claim 12 in which the mounting strips are made of metal with a plastic coating.

14. Apparatus according to claim 12 in which the mounting strips each include a thin, flat metal strip.

* * * * *

UNITED STATES PATENT AND TRADEMARK OFFICE
CERTIFICATE OF CORRECTION

PATENT NO. : 5,246,190
DATED : September 21, 1993
INVENTOR(S) : Hugo L. Swirkal

It is certified that error appears in the above-indentified patent and that said Letters Patent is hereby corrected as shown below:

Column 2, line 26, after "referring" insert -- to --.

Column 2, line 36, before "perspective" insert -- a --.

Column 3, line 34, change "comprises" to -- comprise --.

Column 4, line 36, change "inch" to -- inches --.

In the Claims:

Column 5, line 28, change "claim" to -- claim 1 --.

Signed and Sealed this

Twenty-fourth Day of May, 1994

Attest:

BRUCE LEHMAN

*Attesting Officer*   *Commissioner of Patents and Trademarks*